US008468427B2

(12) United States Patent
Schedelbeck et al.

(10) Patent No.: US 8,468,427 B2
(45) Date of Patent: Jun. 18, 2013

(54) RETRANSMISSION SCHEME FOR COMMUNICATION SYSTEMS

(75) Inventors: Gert Schedelbeck, Munich (DE); Dietmar Schoppmeier, Unterhaching (DE); Bernd Heise, Munich (DE); Umashankar Thyagarajan, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 724 days.

(21) Appl. No.: 12/543,916

(22) Filed: Aug. 19, 2009

(65) Prior Publication Data

US 2009/0313517 A1 Dec. 17, 2009

Related U.S. Application Data

(60) Provisional application No. 61/096,636, filed on Sep. 12, 2008.

(51) Int. Cl.
*H03M 13/00* (2006.01)

(52) U.S. Cl.
USPC .......................................... 714/776; 370/231

(58) Field of Classification Search
USPC .......................................... 714/776; 370/231
See application file for complete search history.

(56) References Cited

U.S. PATENT DOCUMENTS

| 5,477,550 | A | 12/1995 | Crisler et al. |
| 6,094,737 | A | 7/2000 | Fukasawa |
| 6,141,784 | A | 10/2000 | Davis et al. |
| 7,924,710 | B2 | 4/2011 | Rollet |
| 2003/0002501 | A1 | 1/2003 | Reme |
| 2004/0243905 | A1 | 12/2004 | Merritt |
| 2005/0251721 | A1 | 11/2005 | Ramesh et al. |
| 2008/0062872 | A1* | 3/2008 | Christiaens et al. .......... 370/231 |
| 2008/0063007 | A1 | 3/2008 | Christiaens et al. |
| 2008/0244352 | A1 | 10/2008 | Kwon et al. |
| 2009/0067424 | A1 | 3/2009 | Zhang et al. |
| 2009/0077611 | A1 | 3/2009 | Singh et al. |
| 2009/0086759 | A1 | 4/2009 | Heise et al. |
| 2009/0086760 | A1 | 4/2009 | Vedantham et al. |
| 2009/0089638 | A1 | 4/2009 | Heise et al. |
| 2009/0089641 | A1 | 4/2009 | Schedelbeck et al. |

FOREIGN PATENT DOCUMENTS

| CN | 1185690 A | 6/1998 |
| EP | 1626519 A2 | 2/2006 |

OTHER PUBLICATIONS

Non-final Office Action dated Jan. 20, 2012 in connection with U.S. Appl. No. 12/244,037.
Shin H.Y., et al.; "The Study of QoS Guarentee in the Optical Burst Switching Internet Backbone", Optical Switching and Networking, Elsevier, NL, vol. 3, No. 1, Jul. 1, 2006, p. 50-63.
G.inp: Performance of Retransmission Layer at the Gamma Interface; RJ-054, ITU-T Drafts; Study Period 2005-2008, International Telecommunication Union, Geneva; CH, vol. Study Group 15; 4/15, Apr. 8, 2007, p. 1-11.
Final Office Action dated Sep. 27, 2012 for U.S. Appl. No. 12/244,037.

* cited by examiner

*Primary Examiner* — Sam Rizk
(74) *Attorney, Agent, or Firm* — Eschweiler & Associates, LLC

(57) ABSTRACT

One embodiment relates to a method of transmitting data from a transmitter to a receiver. In the method, a payload data stream is provided which comprises a plurality of payload data units. A container stream is formed which comprises a plurality of containers having respective container identifiers, where a container includes an integer number of the payload data units and where the container identifiers collectively establish a predetermined order for consecutive containers. A codeword stream is formed which comprises a plurality of codewords having respective redundancy information, where a codeword includes at least a portion of the container and where redundancy information of the codeword facilitates detection of erroneous data in the codeword. The codeword is transmitted from the transmitter to the receiver. Other methods and systems are also disclosed.

24 Claims, 13 Drawing Sheets

| | | |
|---|---|---|
| FH (Fragment Header): | FSID | Fragment Sequence ID from fragmentation by modem or bonding layer (not necessarily contiguous) |
| | EF (End of Fragment): | $FF_H$ = Fragment size exceeds Container. Remaining fragment data is continued in next Container |
| | | $01H .. FE_H$ = Number of following bytes till end of Fragment |
| | | $00_H$ = Idle data till end of container |
| CH (Container Header): | CID | (Optional) Container Identification |
| | RTX | RTx Protection group (e.g. Eligible for RTx, high delay allowed low delay allowed) |

FIG. 7

RETRANSMISSION SCHEME FOR COMMUNICATION SYSTEMS

REFERENCE TO RELATED APPLICATIONS

This application claims priority to U.S. Provisional Application No. 61/096,570 (entitled "Generic Retransmission Scheme for Communication Systems"), which was filed on Sep. 12, 2008.

This application also claims priority to U.S. Provisional Application No. 61/096,636 (entitled "Flexible Layer Retransmission Scheme Using Correlation Information at different Layers"), which was filed on Sep. 12, 2008.

This application is a continuation-in-part of U.S. Non-provisional application Ser. No. 12/244,037 (entitled "RETRANSMISSION SCHEME FOR COMMUNICATION SYSTEMS"); which was filed on Oct. 2, 2008; where Non-provisional application Ser. No. 12/244,037 claims priority to the following eight U.S. Provisional Applications: (1) Provisional Application No. 60/976,808, filed on Oct. 2, 2007, (2) Provisional Application No. 60/976,839, filed on Oct. 2, 2007, (3) Provisional Application No. 60/984,132, filed on Oct. 31, 2007, (4) Provisional Application No. 60/984,162, filed on Oct. 31, 2007, (5) Provisional Application No. 60/991,809, filed on Dec. 3, 2007, (6) Provisional Application No. 60/991,812, filed on Dec. 3, 2007, (7) Provisional Application No. 61/096,570, filed on Sep. 12, 2008, and (8) Provisional Application No. 61/096,636, filed on Sep. 12, 2008.

The contents of all the above listed Provisional and Non-Provisional applications are herein incorporated by reference in their entirety.

FIELD OF DISCLOSURE

The present invention relates generally to communication systems and more particularly to Digital Subscriber Line (DSL) and wireless communication systems.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment relates to a method of transmitting data from a transmitter to a receiver. In the method, a payload data stream is provided which comprises a plurality of payload data units. A container stream is formed which comprises a plurality of containers having respective container identifiers, where a container includes an integer number of the payload data units and where the container identifiers collectively establish a predetermined order for consecutive containers. A codeword stream is formed which comprises a plurality of codewords having respective redundancy information, where a codeword includes at least a portion of the container and where redundancy information of the codeword facilitates detection of erroneous data in the codeword. The codeword is transmitted from the transmitter to the receiver. Other methods and systems are also disclosed.

The following description and annexed drawings set forth in detail certain illustrative aspects and implementations of the invention. These are indicative of only a few of the various ways in which the principles of the invention may be employed.

BRIEF DESCRIPTION OF THE DRAWINGS

FIG. 7 is chart according to an embodiment of the present invention; and

DETAILED DESCRIPTION

Figure 1:
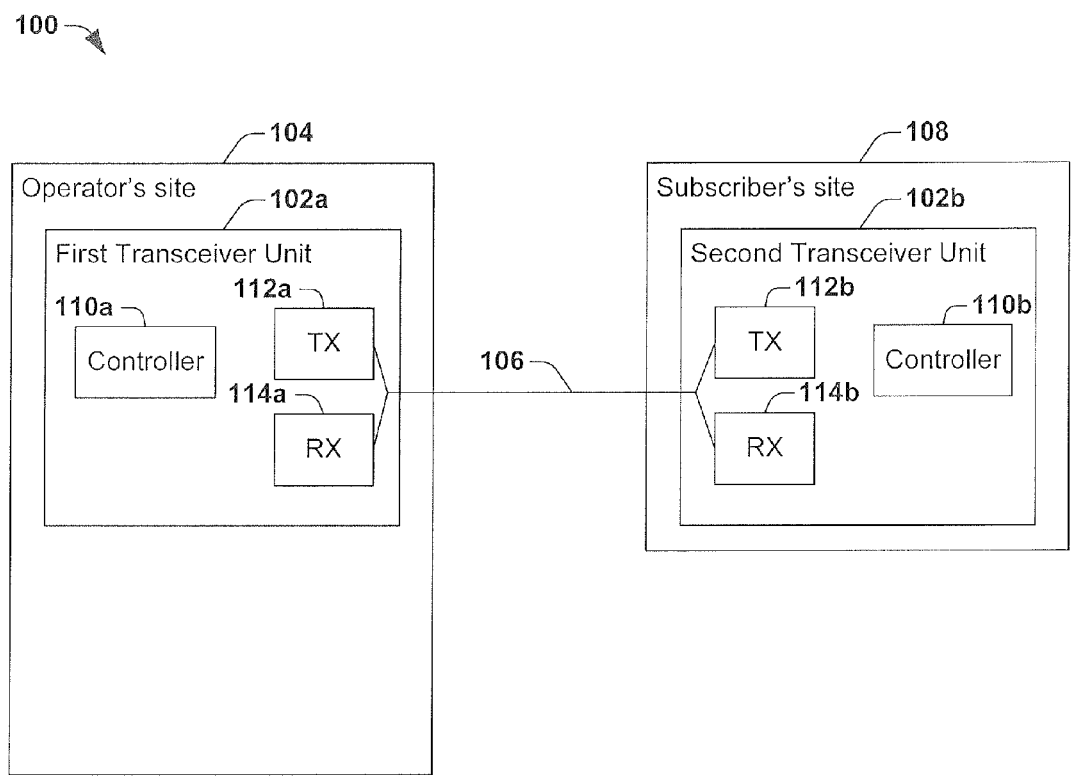
FIG. 1 is a schematic diagram of a DSL communication system according to an embodiment.

One or more implementations of the present invention are now described with reference to the attached drawings, where like reference numerals are used to refer to like elements throughout. Although examples of retransmission schemes are discussed below in the context of VDSL and ADSL systems, it should be noted that the invention in general is applicable to any communication system. Nothing in this detailed description is admitted as prior art.

FIG. 1 shows an embodiment of a DSL communication system 100. As is known to a person skilled in the art, the DSL communication system 100 may be a DMT (discrete multitone) system where data is modulated on plurality of subcarriers such that each subcarrier is associated with one carrier frequency. The DSL communication system 100 comprises a first transceiver 102a provided at an operator's site 104, such as a central office (CO), a cabinet or other network termination unit. The first transceiver 102a is coupled to a second transceiver 102b via a subscriber line 106. The second transceiver 102b is integrated in a customer premises equipment (CPE) subscriber unit 108, such as a modem, router or any other gateway which may also be integrated in other devices such as a personal computer or notebook.

The first transceiver 102a includes a first transmitter 112a and a first receiver 114a coupled to the subscriber line 106. The second transceiver 102b includes a second transmitter 112b and a second receiver 114b coupled to the subscriber line 106. For coupling of the transmitters and receivers each of the transceivers may comprise a coupling interface such as hybrid networks etc.

A first controller 110a may be provided to control and coordinate functions for first transceiver 102a. Furthermore, a second controller 110b may be provided at the subscriber site to control and coordinate functions for first transceiver 102a. While FIG. 1 shows the first and second controllers 110a, 110b integrated with first and second transceivers 102a, 102b, respectively, it is to be understood that the first and second controllers 110a, 110b may be provided separate from the respective transceivers. It is further to be understood that components, such as the first and second controllers, may each comprise multiple components and may be implemented in hardware, software, firmware or any combinations thereof.

Furthermore, while FIG. 1 shows only one subscriber line to a remote subscriber, it is to be understood that the first transceiver 102a may be coupled to multiple subscriber units 108, each of which may have multiple second transceivers 102b thereat. Furthermore, in some embodiments, two or more subscriber lines may be bonded to provide higher data rate to a subscriber.

Figure 2:
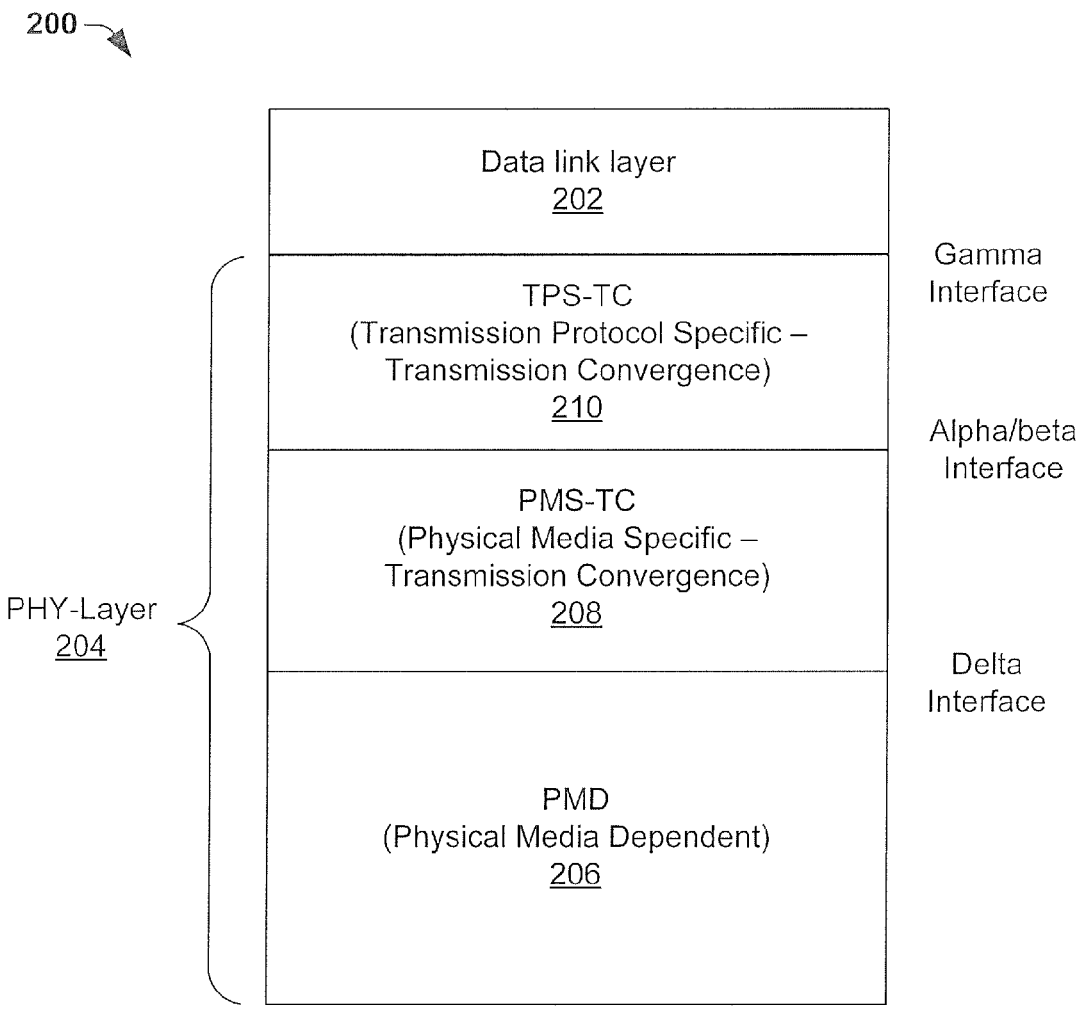
FIG. 2 is a schematic block diagram of a communication layer model.

For a better understanding of how the DSL communication system 100 exchanges data, some layers from an illustrative network protocol stack 200 of a VDSL or ADSL system are explained with respect to FIG. 2. FIG. 2 shows the lowest two layers in the OSI model, i.e. the data link layer 202 and the PHY layer 204. For purposes of clarity and simplicity, higher level levels in the OSI model are not shown. According to FIG. 2, the PHY layer 204 is divided into three PHY-sublayers.

The first PHY-sublayer is the PMD (physical media dependant) layer 206, which includes basic functionality such as symbol timing generation and recovery, encoding and decoding, modulation and demodulation, echo cancellation (if implemented) and line equalization, link startup, and physical layer 204 overhead (superframing). Additionally, the PMD layer 206 may generate or receive control messages via an overhead channel.

The next PHY-sublayer is the PMS-TC (physical media specific-transmission convergence) layer 208 which is connected to the PMD layer 206 through the δ interface (delta-interface). The PMS-TC layer 208 is a management plane and provides management primitive indications to management entities in the CO and CPE modems. The PMS-TC layer 208 also provides functionality such as generation of frames and synchronization of frames, (de)scrambling, Reed-Solomon coding and interleaving.

The third PHY-sublayer is the TPS-TC (transmission protocol specific-transmission convergence) layer 210 which is connected to the PMS-TC layer 208 through an α-interface (alpha-interface) at the Central Office Site or a β-interface (beta-interface) at the subscriber site. The TPS-TC layer 210 provides functionality such as packetizing into frames, organizing of the bearer channels, multiplexing. The TPS-TC layer 210 is connected to the data link layer 202 (layer two in the OSI model) by the γ-interface (gamma-interface).

As data is processed by the network protocol stack 200 and transmitted over the subscriber line 106, impulse noise and cross talk noise can adversely affect the transmitted data. This noise tends to corrupt the transmitted data, causing data to be lost and hindering efficient communication. In current xDSL systems like ADSL and VDSL there are several mechanisms like Trellis coding, RS coding and interleaving specified to mitigate the effects of this noise. However, with the increasing popularity of services such as video, (where lost information can cause "flicker" on the video screen), it is desirable to provide a higher level of service quality than achievable with current techniques.

Retransmission is one technique proposed in this application to increase the quality of video and other applications over DSL. In some embodiments, the retransmission functionality is inserted into the data link layer 202 or physical layer 204 of the network protocol stack 200. In previous solutions, retransmission functionality has been specific to the "Gamma-interface" or "Alpha-interface" (and, thus, retransmission functionality has not interchangeable between layers). By contrast, in some embodiments of the present invention, retransmission functionality is independent of particular network stack layers.

Figure 3:
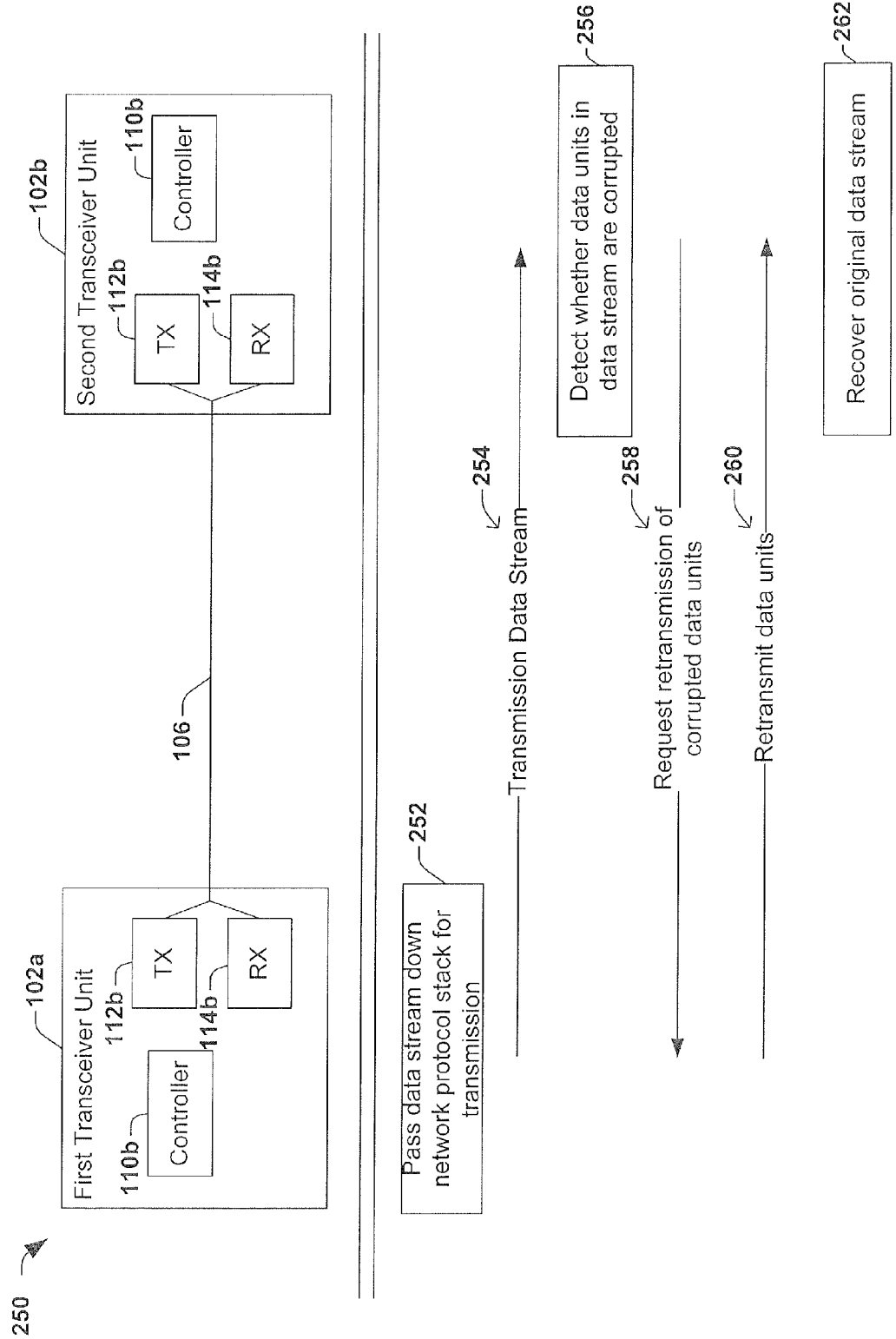
FIG. 3 is a retransmission protocol diagram according to an embodiment.

FIG. 3 shows a somewhat general retransmission protocol 250. As shown, a first transceiver 102a passes a data stream down the network protocol stack for transmission at 252. At 254, the first transmitter 112b transmits a transmission data stream to a second transceiver 102b over the subscriber line 106. Upon the second transceiver 102b receiving the transmitted data stream, the second controller 110b determines whether data units in the data stream are corrupted at 256. If corrupted data units are detected, the second transceiver 102b requests retransmission of the corrupted data units at 258. At 260, the first transceiver 102a responds to this retransmission request by retransmitting the requested data units, thereby allowing the second transceiver 102b to recover the original data stream at 262. It will be appreciated that in other embodiments the second transceiver 102b could act as the transmitter/retransmitter, and the first transceiver 102a could act as the receiver. Several more detailed embodiments are described below with reference to the remaining figures.

Figure 4A:
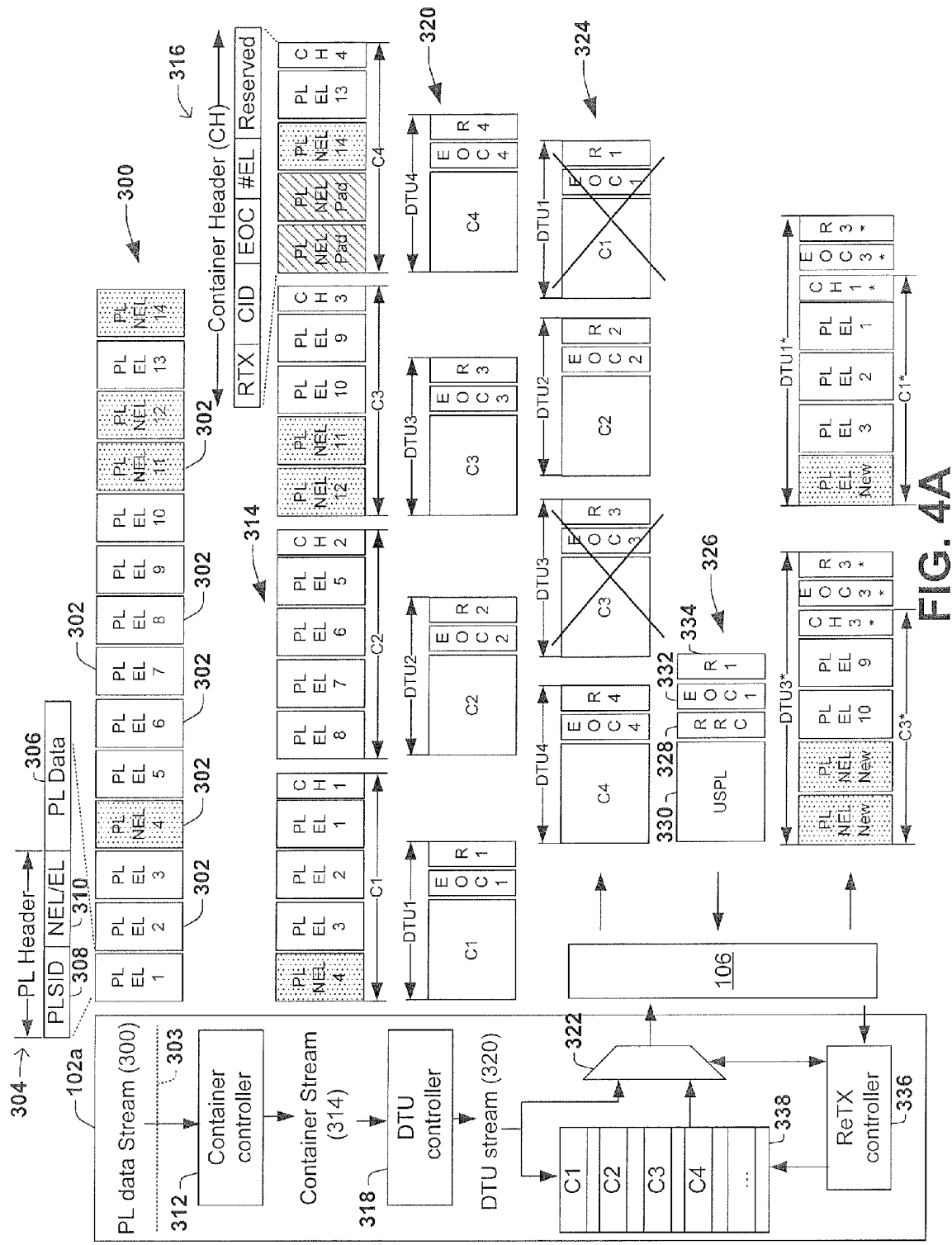
FIG. 4A is a retransmission protocol from the viewpoint of a transmitter according to an embodiment.
Figure 4B:
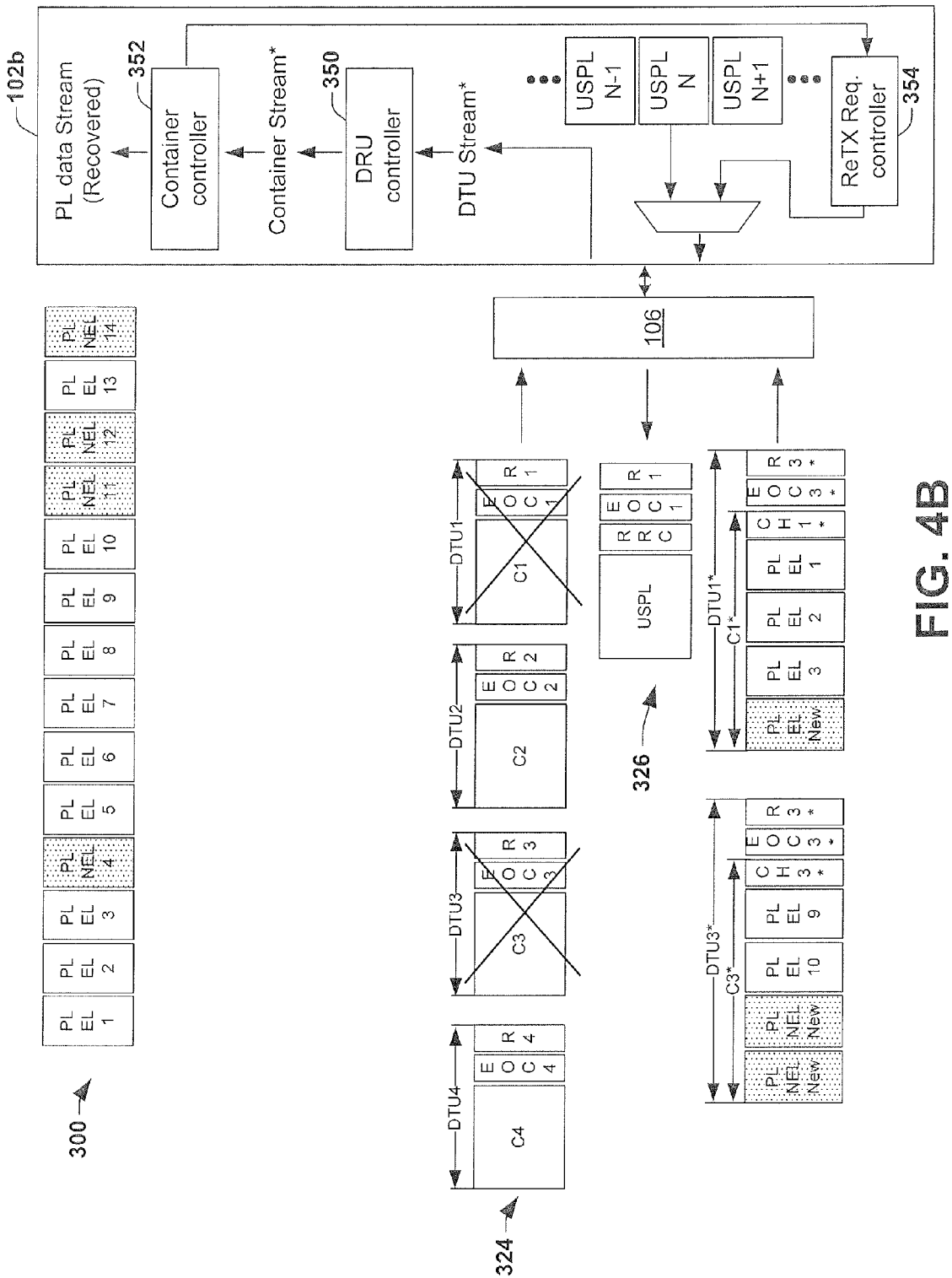
FIG. 4B is a retransmission protocol from the viewpoint of a receiver according to an embodiment.

Referring now to FIGS. 4A-4B, one can see a more detailed retransmission protocol. In particular, FIG. 4A shows the protocol from the point of view of a transmitter (e.g., first transceiver 102a) and FIG. 4B shows the protocol from the point of view of a receiver (e.g., second transceiver 102b). This embodiment is based on grouping several data units together into a container, and then associating a container identifier (CID) with the container as a reference for retransmission. Compared to prior art systems, this embodiment achieves a low overhead rate that results in more efficient communication.

On the transmitter-side, FIG. 4A shows a payload data stream 300 received at a network interface layer 303 (e.g., at the gamma interface). The payload data stream 300 includes a number of individual payload data units 302 (PL) labeled as either eligible for retransmission (EL) or non-eligible for retransmission (NEL). In some embodiments, each data unit 302 constitutes a single complete packet or cell from a higher level network protocol layer (e.g., Ethernet packet or Asynchronous Transfer Mode (ATM) cell).

Each data unit can be made up of a payload header 304 and payload data 306. The payload header 304 often includes a payload sequence identifier (PLSID) 308 and a retransmission identifier 310 (NEL/EL). The PLSID 308 specifies the position of the data unit relative to other data units in the payload data stream 300, thereby allowing the upper layer protocol at a receiver to re-assemble the payload data stream 300 in the proper order. The retransmission identifier 310 indicates whether the data unit is either eligible for retransmission (EL) or non-eligible for retransmission (NEL). For example, real-time voice data could be classified as NEL because retransmission would result in unacceptable latency (delay) between a conversation's participants. By contrast, video or FTP data could be classified as EL because it could be buffered without causing unacceptable latency.

After being received at the network interface layer 303, this payload data stream 300 is processed by a container controller 312, which may be positioned at the gamma interface. The container controller groups the payload data stream 300 into a container stream 314 made up of a series of containers (e.g., C1, C2, C3, C4). Each container includes a container header and a series of data units. For example, container4 (C4)

includes container header (CH4) as well as four payload data units: payload-EL-13, payload-NEL-14, and two pad/dummy units. Although FIG. 3 shows an example where all the containers contain the same number of data units (i.e., four data units), in other embodiments different containers can include different numbers of data units, so long as the differing lengths are known to both transmitter and receiver.

The container header 316 can include several fields. For example, the illustrated fields include: (a) a first-transmission/retransmission field (RTX) that indicates whether the data in the container header is being transmitted for the first time or is being retransmitted, (b) a container identifier (CID) that uniquely identifies a given container, (c) an embedded overhead channel (EOC) byte; (d) an (#EL) field that indicates the number of EL data units in the container; and (e) a reserved field that can be include other useful information.

After a container is generated, a DTU controller (data transmission unit controller 318, which may be positioned at the alpha/beta interface) processes the container, thereby generating a DTU stream (data transmission unit stream 320). Each illustrated DTU (e.g., DTU1) includes a single container (e.g., C1), redundancy bits (e.g., R1), and an embedded overhead channel (EOC) byte (e.g., EOC1). In case of ATM, the redundancy bits are based on Reed-Solomon (RS)-check codes; while in case of ATM, the redundancy bits are based on cyclic redundancy checks (CRC). In other embodiments, each DTU could include multiple containers, and different DTUs could include different numbers of containers.

A transmission controller 322 forms a transmission data stream 324 that is transmitted over the subscriber line 106. This transmission data stream could include containers transmitted for their first time and retransmission containers. When the transmission data stream 324 is transmitted, noise (e.g., impulse noise) may corrupt the data in the DTUs, for example as indicated by the "X"s on DTU1 and DTU3.

If the receiver detects erroneous data, the receiver sends a retransmission request 326 back to the first transceiver 102a. The retransmission request 326 specifies the containers that were received with erroneous data. For example, in the illustrated embodiment, the RRC field 328 in the retransmission request 326 can specify the CIDs of corrupted containers received at the receiver. In some embodiments the RRC field 328 can be piggybacked with upstream payload data (USPL) 330 that is transmitted from the second transceiver 102b to the first transceiver 102a, along with an EOC field 332 and redundancy bits 334. In one embodiment, the retransmission request 326 includes a fixed number of bytes per symbol. In this case, the receiver can request the number of containers per symbol.

Upon receiving the retransmission request 326, a retransmission controller 336 retrieves the containers specified in the RRC field 328. To facilitate this functionality, the single copy of each DTU from the transmission data stream 324 (or at least the container associated with the DTU) is stored in a retransmission buffer 338. These DTUs can be stored in the retransmission buffer 338 for up to some expiration time after transmission or until the retransmission buffer 338 is full. In retrieving the containers to be retransmitted, the retransmission controller 336 can use a look-up table that correlates the CID(s) indicated in the retransmission request 326 with the container's address in the retransmission buffer 338.

After looking up the container to be retransmitted, the retransmission controller 336 then pulls only the payload EL data units from the original container (i.e., ignoring the payload NEL data), and then appends new data (e.g., previously untransmitted EL, NEL or pad data) to fill the remainder of the container to be retransmitted. Thus, in FIG. 3's example, container1 (C1*) is retransmitted with original EL-data-unit-1, original EL-data-unit-2, and original EL-data-unit-3 along with a data unit of new data; while container3 is retransmitted with original EL-data-unit-9 and original EL-data-unit-10 along with two data units of new data. The container headers for these retransmitted containers include the CID of the original container and specify that the containers are retransmission containers. Redundancy bytes and EOC bytes are then appended to the containers, and the retransmission containers are inserted into the transmission data stream and transmitted over the subscriber line 106.

Referring now to FIG. 4B, one can see the receiver-side protocol. In this example the receiver receives from over the subscriber line 106 the DTU stream, which includes corrupted DTUs (DTU1, DTU3). The data reception unit (DRU) controller 350 then uses the redundancy bytes to detect whether errors are present in each DTU. If possible, the DRU controller 350 may use the redundancy bytes to correct these errors. Upon receiving the container stream, which now includes "holes" where the corrupted containers occurred, a container controller 352 notes which containers need to be retransmitted and sends a control signal to a retransmission request controller 354. For example, in FIG. 3, the control signal would specify that container1 and container3 are corrupted, and therefore should be retransmitted. The retransmission request controller 354 then sends a retransmission request 326 back to the first transceiver 102a indicating which containers need to be re-transmitted. In time, the receiver receives the retransmitted containers C1*, C3*, which may also include new data, and will recover the originally transmitted payload data stream 300.

One major problem with some existing retransmission schemes is that there is no protection for the embedded overhead channel (EOC) data. To remedy this shortcoming, in some embodiments the transmitter, upon receipt of a retransmission request, checks if the CID of the container is associated with EOC data. If there is EOC data associated with the container, then the EOC data is retransmitted to the receiver along with the payload EL data of the container.

Figure 5:
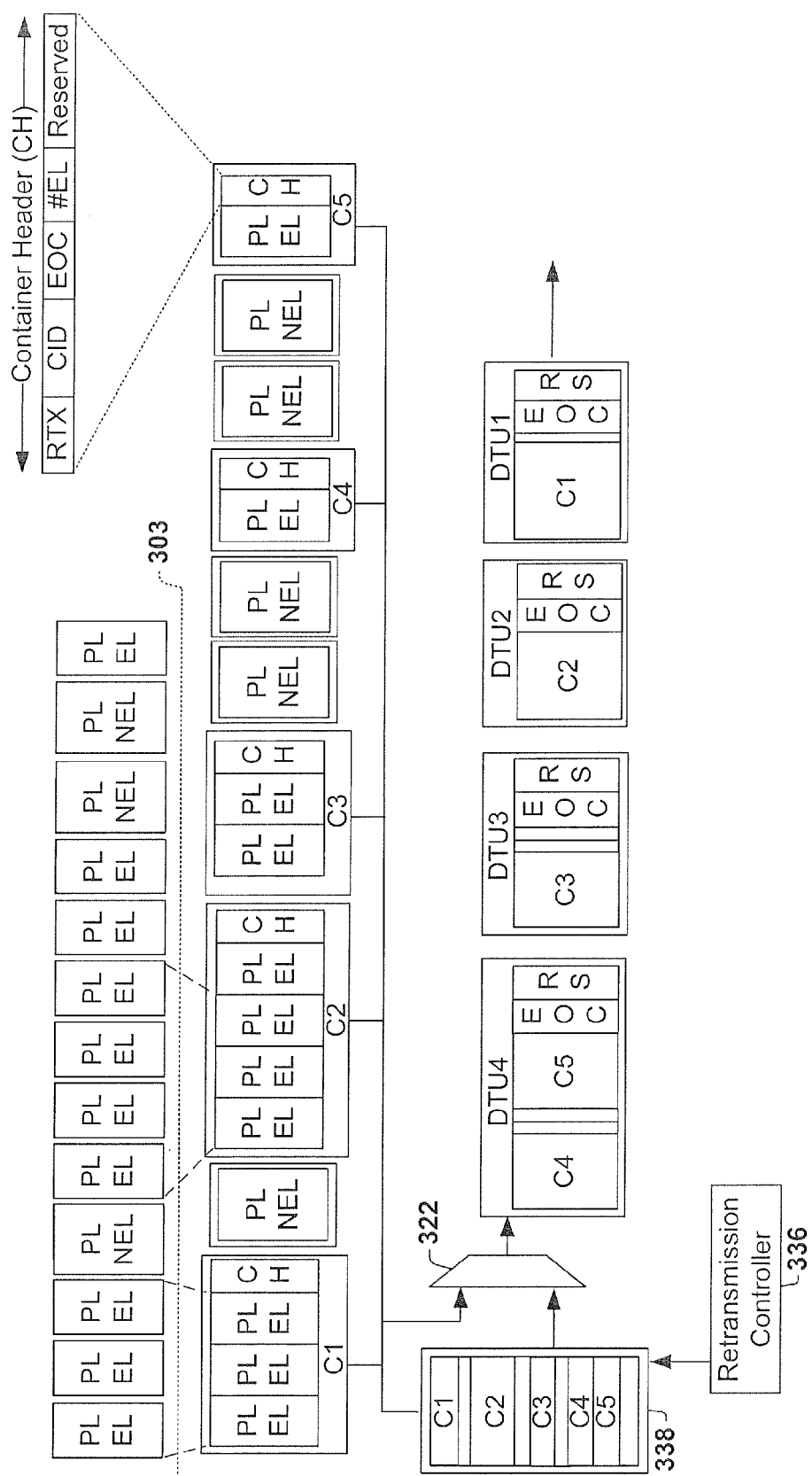
FIG. 5 is a retransmission protocol according to an embodiment.

FIG. 5 shows another embodiment of how the container controller 312 can group data units into containers. In this example, a container is packed with contiguous bytes of EL data up to a maximum container size, then labeled with a CID (which may reside in a container header). If NEL data is encountered before the maximum container size is reached, the container is "closed" and labeled with a CID directly after the last EL data. The NEL data is then packed into the next container. This packing technique allows a receiver to request retransmission of containers that include only EL data (i.e., the requested containers do not include NEL data). DTUs are then grouped to include the consecutive containers as shown, with redundancy and EOC information added. Therefore, for very long contiguous packets (e.g., video packets, which are a typical case), this embodiment realizes very low overhead for retransmission.

Figure 6:
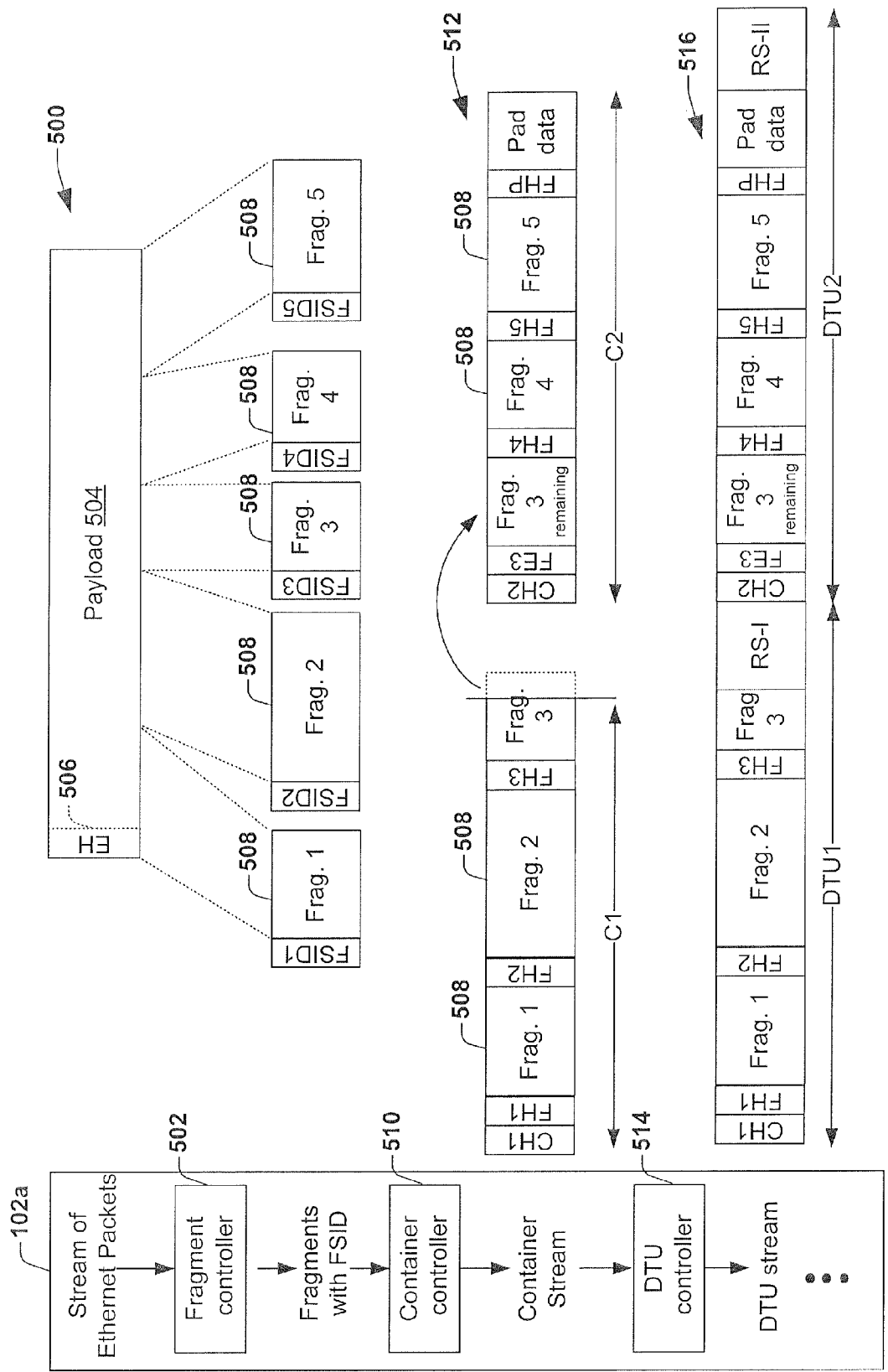
FIG. 6 is a retransmission protocol from the viewpoint of a transmitter according to an embodiment.

Referring now to FIG. 6, one can see still another embodiment of a retransmission scheme which is suitable for different types of TC layer payload. This embodiment is somewhat similar to those previously discussed, however, in this embodiment the payload data unit is an Ethernet packet that is fragmented before to being grouped into a container.

More specifically, a stream of Ethernet packets 500 is received at a fragment controller 502. Each Ethernet packet includes payload data 504 and an Ethernet header (EH) 506, which specifies an Ethernet packet sequence number. The fragment controller 502 then breaks the Ethernet packet into fragments 508 and appends fragment sequence identifier, FSID, to each fragment.

A container controller 510 than packs the fragments 508 into containers 512, whereby some fragments may be "split" between containers. For example, fragment3 is split between containers C1 and C2). Often, each container may include a container header (CH) and a series of fragment headers (FH) identifying the boundaries of fragments within the container. As discussed in more detail below, the FH may include the FSID as well as other information.

After the containers are packed, the DTU controller 514 appends Reed-Solomon redundancy bytes the end of each container to form a transmission data stream 516. The transmission data stream is then transmitted over the line.

If the receiver receives uncorrectable data, the receiver can provide the FSID corresponding to the uncorrectable data back over the line to the retransmission controller of the transmitter. The retransmission controller can then retransmit the necessary data associated with the FSID. Notably, because DSL systems maintain various counters for performance monitoring, as long as the transmitter and receiver keep count of the DTUs there is no need to transfer any label other than the FSID in this embodiment. Thus, since the transmitter and receiver are synchronized in DSL, there is no need to transmit CIDs from transmitter to receiver in this embodiment. Consequently, by not transmitting CIDs, some amount of overhead is saved.

As FIG. 7 shows, the fragment header (FH) may include the FSID field as well as an End of Fragment (EF) field. The illustrated EF field includes an illustrative coding scheme that could be used to identify how the end of the fragment aligns with respect to the end of a container. Other coding schemes could also be used. Additional fields in the fragment header (not shown) can also indicate the alignment of EL data and NEL data within a given fragment or between fragments, or can indicate the alignment of retransmitted data and newly transmitted data within a given fragment or between fragments.

In one embodiment, the containers having EL data have unique container IDs and the containers having NEL have the ID of the previous eligible container. Along with the retransmission eligibility information and the unique sequence ID for data unit, the retransmission system can identify the corrupted data using error detection/correction technique and if the data that is corrupted belongs to the eligible data stream. One advantage with the scheme is that only the eligible stream carries unique IDs and non eligible data carries the ID of the eligible container. So, if a non eligible data container is lost, the receiver will not even request the lost data because there must have been an earlier container received successfully with eligible data.

Figure 8:
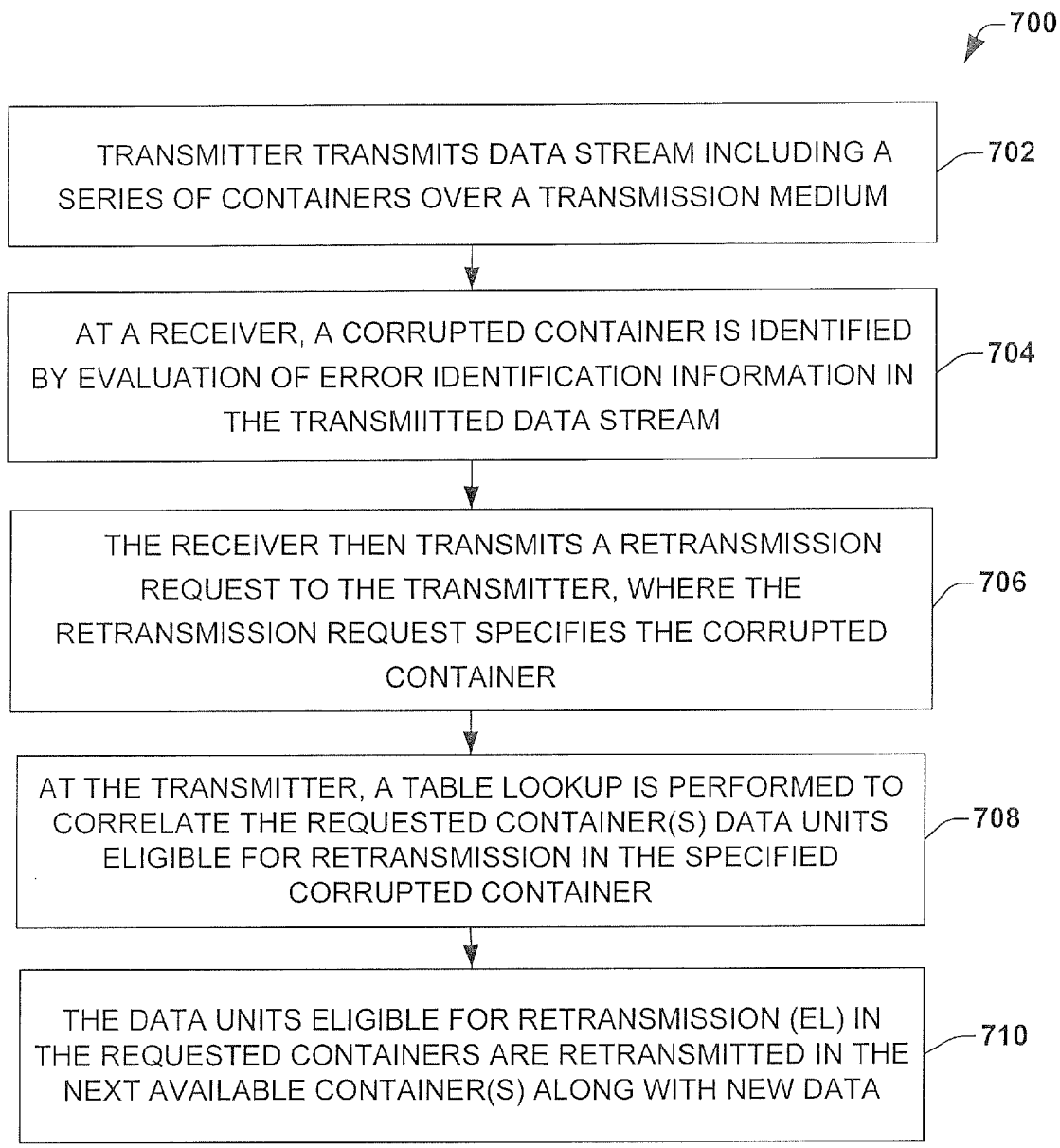
FIG. 8 is a flowchart in accordance with one embodiment

FIG. 8 shows a method for retransmission 700 and is now briefly discussed. While the method 700 illustrated below is illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

At 702, a transmitter transmits a transmission data stream that includes a series of containers over a transmission medium.

At 704, a receiver receives the transmission data stream, which may have been altered by noise on the transmission medium. The receiver identifies whether the received data stream includes corrupted container(s) by evaluating error identifying information that is transmitted in the transmission data stream.

At 706, assuming a corrupted container is found, a retransmission request is then transmitted from the receiver to the transmitter. The retransmission request specifies one or more containers that were corrupted by noise during transmission.

At 708 the retransmission request is processed by the transmitter. In this block, a table lookup is performed to correlate the requested container(s) and data units that were originally transmitted in the requested container(s). At 710, the EL data units in the requested containers are retransmitted in the next available container(s).

In some embodiments, "Container repetition" may be used instead of "frame blanking", thereby temporarily stopping or limiting transmission during intervals in which repetitive electrical impulse noise (REIN) occurs.

Thus, the above described embodiments are flexible retransmission schemes that do not limit the size of the data unit. The retransmission schemes use "just enough" overhead when needed, because only the eligible data is encapsulated. It may be argued that the above property can lead to additional overhead whenever there a mix of eligible and non eligible data, but from the application and practical scenarios this is seldom the case, because the eligible data like video are usually contiguous long data packets.

Although the above described embodiments are described with regards to data units that are eligible/non-eligible for retransmission (i.e., two eligibility levels, which may be indicated by a single bit), in other embodiments, additional levels of eligibility levels can be included. For example, three or more levels of eligibility may be used. For example, in some embodiments, "level 1" could be low retransmission eligibility (e.g., retransmit a container only once), "level 2" could be mid-level retransmission eligibility (e.g., retransmit a container only twice), and "level 3" could be high-level retransmission eligibility (e.g., retransmit a container as often as needed to accurately convey the intended message). Several types of criteria can be used to classify data units as eligible for retransmission or non-eligible for retransmission, examples include, but are not limited to: application type, eligible under certain external conditions, (e.g., noise); never eligible; always eligible; and/or eligible for retransmission for a time window. The eligibility criterion for classes of data associated with the retransmission can be changed dynamically based on external criterions like noise characteristics. For example, if the system detects impulse noise on the line, the retransmission eligibility could be set to "level 1", while if the system detects Gaussian white noise on the line, the retransmission eligibility could be set to "level 3." Although an example with 3 levels has just been discussed, it will be appreciated that such eligibility transmission levels could extend to practically infinity, depending on bandwidth and performance requirements.

It will be appreciated that some aspects of the invention do not require classifying data units as eligible for retransmission or non-eligible for retransmission. FIGS. 9-12 show some examples that operate without eligible/non-eligible classifications, although these examples can be combined with the eligible/non-eligible classifications as previously described.

Figure 9:
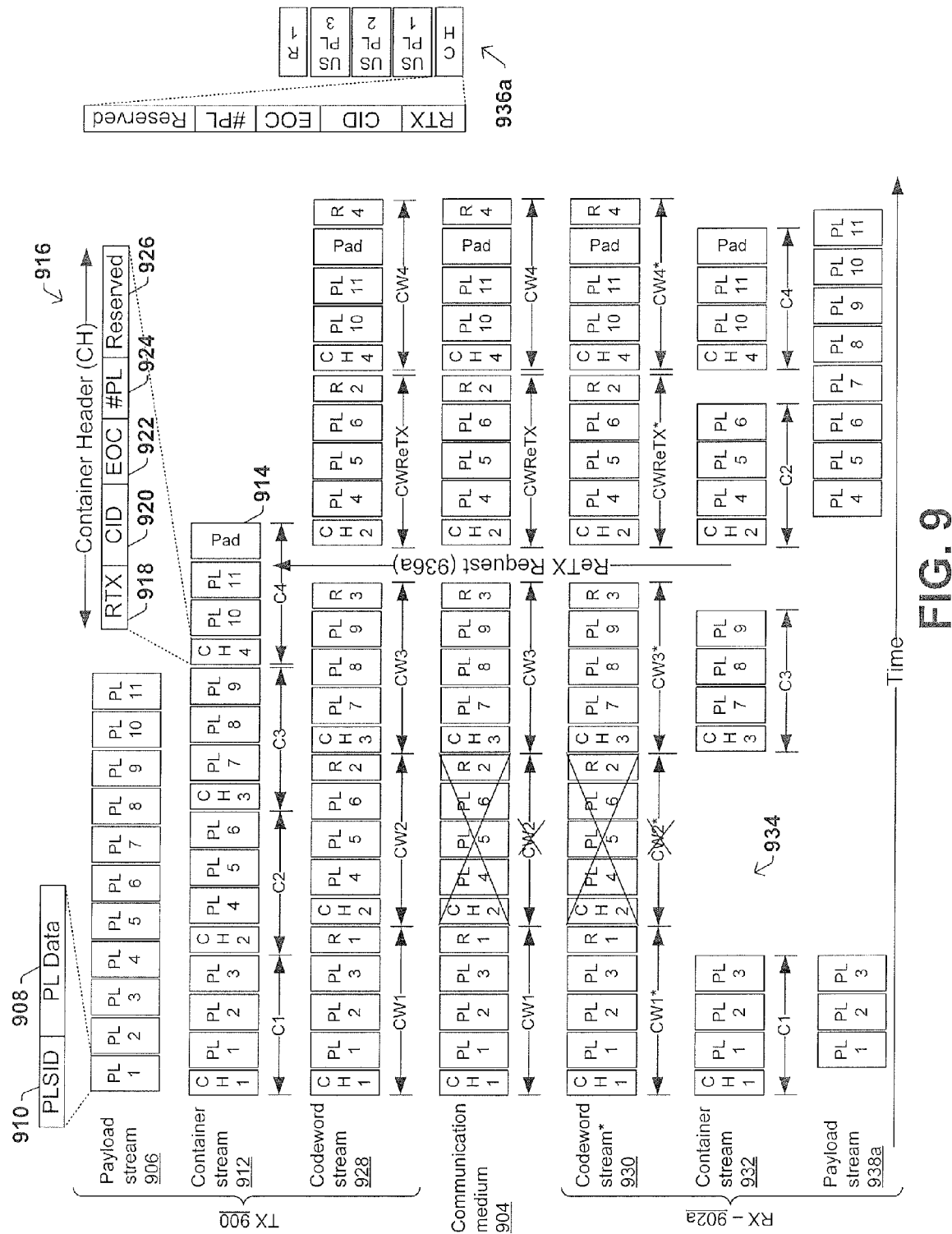
FIG. 9 illustrates an embodiment of a retransmission protocol carried out between a transmitter and receiver.

FIG. 9 shows an example where a payload data stream (906) is transmitted from a transmitter 900 to a receiver 902*a* over a communication medium 904. If the receiver 902*a* detects corrupted data, the receiver 902a can request retransmission of the corrupted data to ensure the receiver 900a can accurately re-assemble the payload data stream (at 938a). Note that for simplicity, FIG. 9 does not show transmission delay over the communication medium or between network layers in the transmitter and receiver.

More particularly, a payload data stream 906 is received at a first network interface in the transmitter 900. The payload data stream 906 includes a number of payload data units (e.g., PL1, PL2, ..., PL11). Each payload data unit can include payload data 908 and a payload sequence ID (PLSID) 910, where the PLSIDs collectively specify a predetermined order of consecutive payload data units in the payload data stream 906. For example, in a straightforward example, PL1 could be assigned a PLSID of "1", PL2 could be assigned a PLSID of "2", PL3 could be assigned a PLSID of "3", and so on. It will be appreciated that PLSIDs are not required in all implementations, and that various embodiments may use eligible/non-eligible classifications even though not illustrated in FIG. 9.

A container stream 912 is formed when the payload data units are packed into containers (e.g., C1, C2, C3, C4). In typical embodiments, an integer number of payload data units are packed into each container. For example, in the illustrated embodiment, three payload data units (e.g., PL1, PL2, and PL3) are packed into container C1. Container headers (e.g., CH1, CH2, CH3, CH4) are attached to respective containers (e.g., C1, C2, C3, C4, respectively). In addition, padding 914 can also be used, for example, if it is desired that respective containers contain the same number of payload data units.

Each container header (e.g., CH4) can include several different bit fields, as shown by 916. A first bit field (RTX) 918 indicates whether the container is being transmitted to the receiver for the first time, or whether the container is a retransmission container. For example, in one embodiment, the first field RTX 918 could be a single bit in length, where a "0" value indicates the container is transmitted for the first time and a "1" value indicates the container is being retransmitted. In other embodiments, multiple bits could be included to identify multiple levels of retransmission or for other purposes.

A second bit field (CID) 920 includes a container identifier that is unique to the container. In some embodiments, the container identifiers are assigned to containers according to a pattern that establishes a pre-determined order for the consecutive containers in the container stream 912. For example, in one embodiment the pattern could be a sequential pattern where a first container (C1) is assigned a container identifier of "1", a second container (C2) is assigned a container identifier of "2", and so on.

A third bit field (EOC) 922 is an embedded overhead channel bit field, which can include channel management functionality, such as bit-loading or framing parameters, for example.

A fourth bit field (#PL) 924 indicates the number of payload data units in the container. For example, in the illustrated embodiment, the #PL bit field for CH4 specifies that "3" payload units are present in container C4. It will be appreciated that although the illustrated embodiment shows an equal, integer number of payload units packed into respective containers, different containers can have different numbers of payload units.

A fifth bit field (Reserved) 926 can be used for other suitable functionality. For example, in some instances, a container can include a fractional portion of a payload unit (rather than a whole integer number of payload units as illustrated), in which case the reserved bit field can include suitable bits to delineate how the fractional portion of the payload unit is aligned relative to the container's boundaries.

A codeword stream 928 is formed by appending redundancy information, such as Reed-Solomon bytes, to the respective containers. In the illustrated embodiment, for example, redundancy bytes R1 are calculated based on container C1 (which includes CH1, PL1, PL2, and PL3) and appended thereto to form codeword CW1; and redundancy bytes R2 are calculated based on container C2 (which includes CH2, PL4, PL5, and PL6) and appended thereto to form codeword CW2. Note that although the illustrated example shows a one-to-one correspondence between containers and codewords, such a one-to-one correspondence is not necessary. For example, in some embodiments, an integer number of containers (greater than one) can be contained in a single codeword. In other embodiments, a single container can span an integer number of codewords (greater than one). It will also be appreciated that in these and other embodiments, a boundary of a codeword need not be aligned to a boundary of a container.

The codewords are then framed and modulated as symbols over the communication medium at 904. Noise (e.g., impulse noise or Gaussian noise) can corrupt one or more symbols, causing the data of a corresponding codeword to be corrupted. In FIG. 9's example, one or more symbols corresponding to codeword CW2 has been corrupted (as indicated by the "X" over CW2 and its data.)

The receiver 902a receives and demodulates the symbols to build a received codeword stream* 930. The receiver 902a uses the redundancy information in respective received codewords to determine whether the respective codewords are received correctly. For example, to confirm codeword CW1* is received correctly, the receiver will calculate redundancy bytes based on the container header CH1 and received payload data units PL1, PL2, and PL3. If the calculated redundancy bytes correspond to the received redundancy bytes R1, the codeword CW1* has been received correctly without erroneous data.

The receiver 902a then generates a container stream 932 that is made up of correctly received containers. In the illustrated example, the container stream 932 has a "hole" 934 between container C1 and container C3, where the hole 934 corresponds to container C2, which was lost due to corrupted codeword CW2*.

As the containers are received in the container stream 932, the receiver 902a can verify that each newly received container has a CID that follows the predetermined pattern from that of a previously received container. If CID of the newly received container does not follow appropriately from that of a previously received container, the receiver can transmit a retransmission request 936a back to the transmitter that specifies the missing container be retransmitted. For example, in the illustrated example, when container C3* is received having a CID of "3", the receiver compares the CID of "3" with the previously received CID for container C1. Because container C1 has a CID of "1", which is non-consecutive with "3", the receiver infers that a container having a CID of "2" has been lost.

Therefore, the receiver 902a generates a retransmission request 936a that indicates that the transmitter is to resend the lost container to the receiver. As shown, the retransmission request 936a can include a container header CH, as well as upstream payload data (USPL1, USPL2, USPL3) to be transmitted from the receiver to the transmitter. The retransmission request 936a can also be protected by redundancy information (e.g., R1). The container header CH can include several fields, which in this embodiment are shown to be the same as for initially transmitted containers for simplicity. In this example of a retransmission request 936a, the RTX field is set to "1", thereby indicating the request is requesting retransmission. The CID field is set to CID="2", thereby specifying that container C2 (previously transmitted from the transmitter), which had a CID of "2" is to be retransmitted. In this way, the retransmission request 936a notifies the transmitter which container is to be retransmitted.

After the retransmission request is received at the transmitter 900, the transmitter can construct a retransmission container in one of several ways. In some embodiments, for example, the transmitter can retrieve a bit-for-bit replica of the originally transmitted container (e.g., from a retransmission buffer), and then retransmit the container to the receiver in response to the retransmission request. This is advantageous in some ways because it limits the amount of processing needed for retransmission. In other embodiments, the transmitter can reconstruct the requested container from payload data units. In these other embodiments, some header information or other information (e.g., redundancy bits) may be different between the originally transmitted container and the retransmitted container. In the illustrated embodiment, the retransmission container is used to generate a retransmission codeword CWReTX. Thus, codeword CWReTX has payload data corresponding to that of codeword CW2, which was corrupted when originally transmitted. In the illustrated example, codeword CWReTX is successfully received at the receiver, thereby allowing the receiver to receive the payload data units of container C2, albeit after already receiving container C3.

Ultimately, the payload stream 906 from the transmitter is reassembled at the receiver as 938a. Note, however, in order to keep the received payload data stream 938a in the same order as the original payload data stream 906, the receiver can analyze the PLSIDs in the received payload data units and re-arrange them so that they are in the same order as in original payload stream 906. Accordingly, the receiver may include a buffer that stores the received payload data units and analyzes their PLSIDs to forward them according to the predetermined order. In this way, the retransmission technique of FIG. 9 can help ensure data is accurately transmitted from transmitter 900 to receiver 902a.

Figure 10:
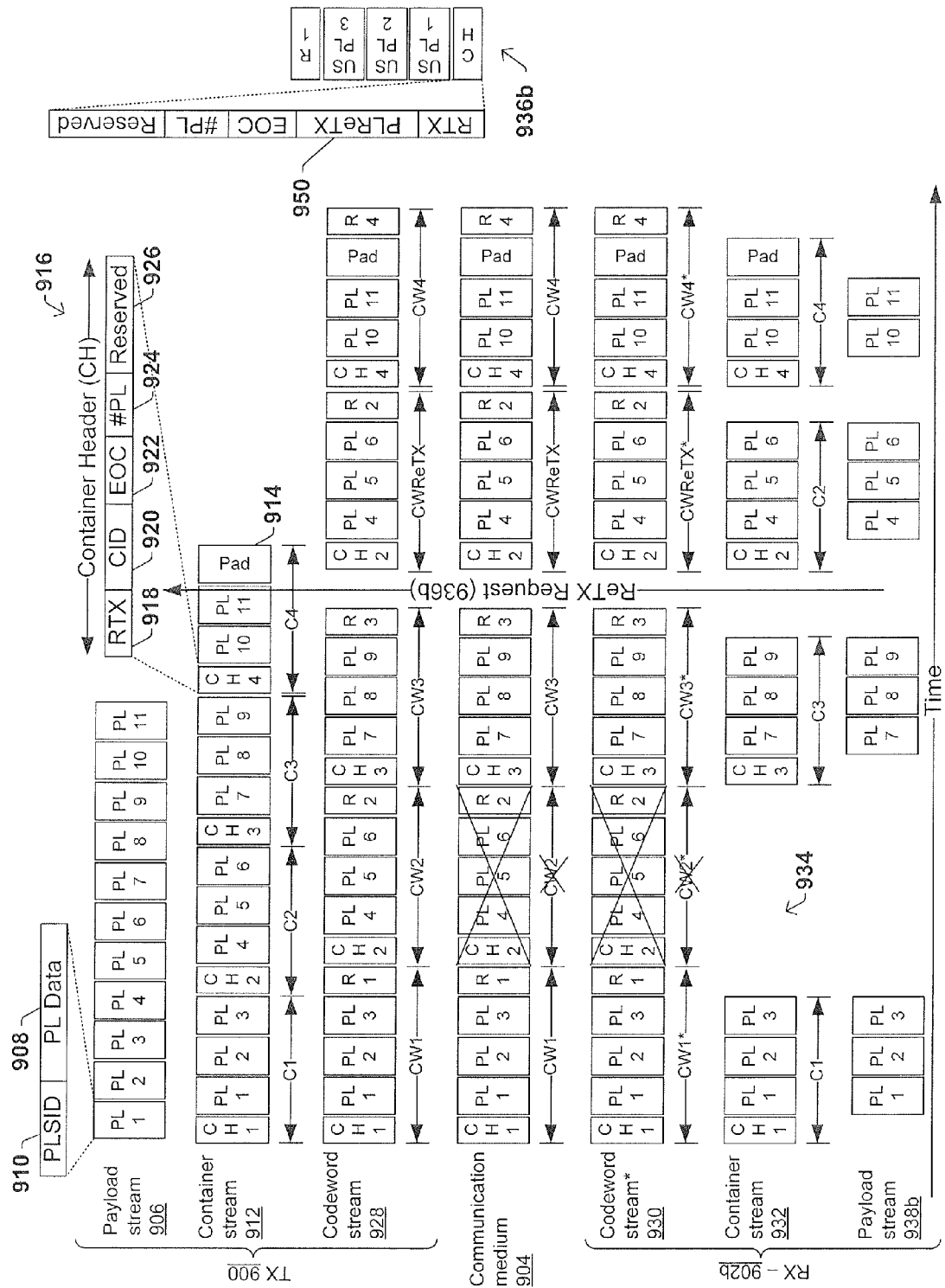
FIG. 10 illustrates another embodiment of a retransmission protocol carried out between a transmitter and receiver.

FIG. 10 illustrates another type of receiver 902b that bases retransmission on the received payload data stream 938b, rather than on the received container stream 932 (as shown in FIG. 9). Nonetheless, because of the manner in which data is transmitted (e.g., an integer number of payload data units are included in a container), the transmitter 900 is interoperable with both receiver 902a (FIG. 9) and receiver 902b (FIG. 10).

More particularly, the receiver 902b in FIG. 10 analyzes the stream of payload data units 938b at the first network layer. If the receiver in FIG. 10 detects, for example, that consecutively received payloads units do not have sequential payload sequence IDs, the receiver in FIG. 10 generates a retransmission request 936b. In contrast to retransmission request 936a of FIG. 9 (which specified a "lost container"), the retransmission request 936b of FIG. 10 specifies the "lost" payload data units (PLReTX) at 950. Thus, in the illustrated example where payload data units PL4, PL5, and PL6 were corrupted in CW2, the retransmission request 936b specifies PL4, PL5 and PL6 in field PLReTX to enable retransmission of these payload data units.

In this example, the transmitter 900 receives the retransmission request 936b and generates a retransmission container that includes PL4, PL5, and PL6. The transmitter then appends redundancy information to the retransmission container to form retransmission codeword (CWReTX), which is transmitted and received correctly at the receiver 902b. If it is desired that the payload data units in the payload data stream 938 follow a predetermined order, the receiver can re-order the payload data units based on their PLSID.

Consequently, when FIG. 9 and FIG. 10 are viewed together, it can be appreciated how the illustrated transmitter 900 (which packs an integer number of payload data units into a container) enables retransmission at two different network layers (i.e., a first network layer at which payload data units are processed, and a second network layer at which containers are processed). In this way, the illustrated transmission techniques enable a single transmitter to be compatible with two different receivers that carry out two different retransmission techniques, respectively. Historically, prior art transmitters have not provided for such interoperability and have therein made communication less than ideal.

Figure 11:
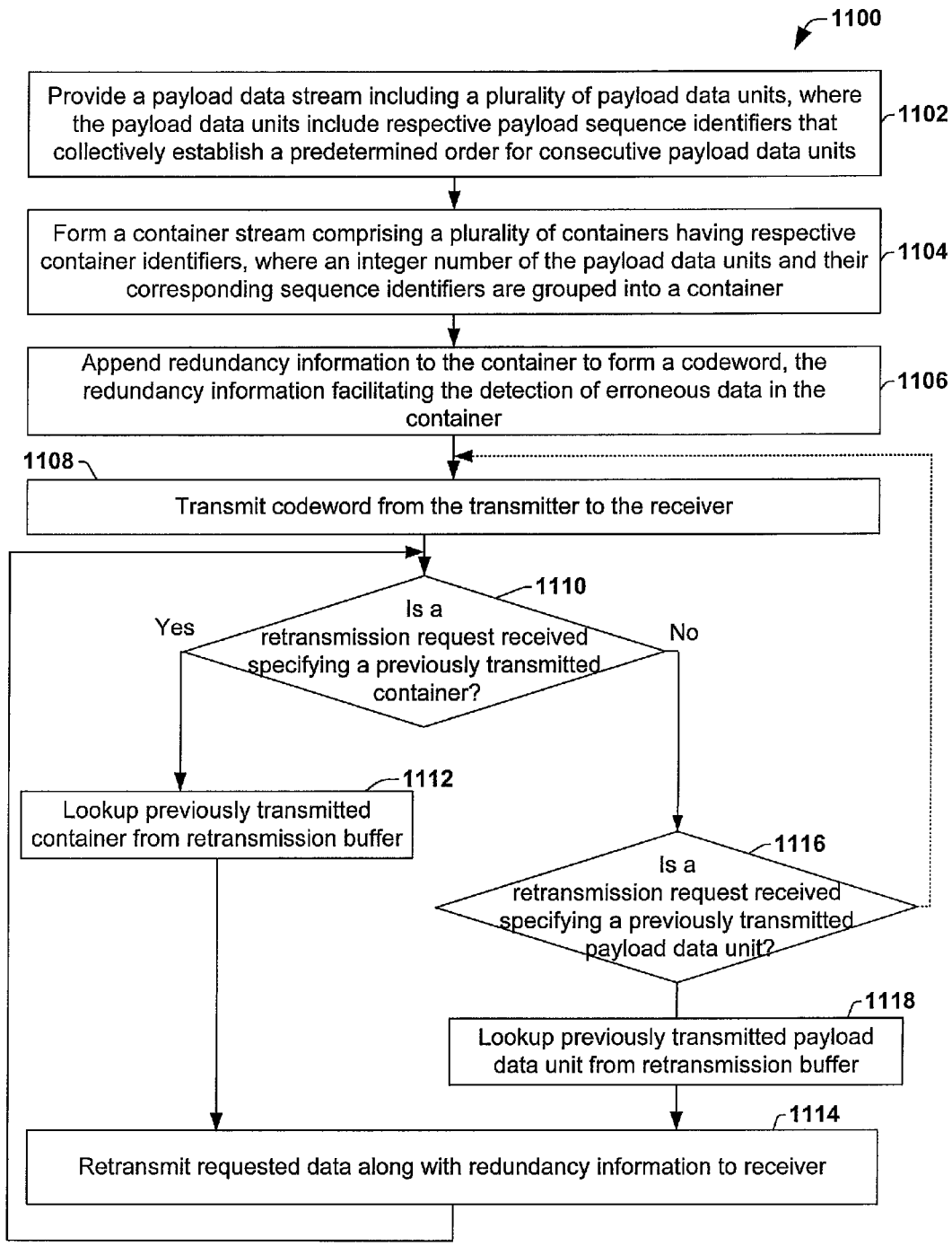
FIG. 11 illustrates a retransmission protocol as carried out by a transmitter.

FIG. 11 depicts a method to be carried out by a transmitter. The method 1100 starts at 1102, when a payload data stream is provided at a first network interface (e.g., γ-interface). The payload data stream includes a number of payload data units that optionally have respective PLSIDs that collectively establish an order for consecutive payload units.

At 1104, a container stream is formed in a second network layer (e.g., α/β interface or δ-interface). The container stream includes a number of containers having respective container identifiers, where an integer number of payload data units and their corresponding PLSIDs are grouped into a container.

At 1106, redundancy information is appended to the container to form a codeword. This redundancy information facilitates the detection of erroneous data in the container.

At 1108, the codeword is transmitted from the transmitter to the receiver.

At 1110, the method determines whether a retransmission request is received that specifies a previously transmitted container. For example, in previously described FIG. 9, the retransmission request 936a provided by receiver 902a specifies only an erroneously received container without explicitly specifying erroneous payload data units. If such a retransmission request is received ("Yes" at 1110), the previously transmitted container identified in the retransmission request is looked up in a retransmission buffer in the transmitter at 1112. The requested container is then retransmitted along with redundancy information to the receiver in 1114.

On the other hand, if a retransmission request is not received specifying a previously transmitter container ("No" at 1110), the method determines whether a different type of retransmission request is received. Namely, at 1116, the method determines whether a retransmission request is received specifying a previously transmitted payload data unit. For example, this block could correspond to previously described FIG. 10 where a retransmission request 936b specifies only an erroneously received payload data unit without specifying a container. If so ("Yes" at 1116), the method looks up the previously transmitted payload data unit from a retransmission buffer at 1118. At 1120, the method retransmits the requested data along with redundancy information to the receiver.

By analyzing for at least two different types of retransmission requests at 1110 and 1116, respectively, the method 1100 may provide for interoperability between different receivers. This is because the first type of retransmission request in 1110 can correspond to one type of receiver that implements one retransmission protocol on a first network layer, while the second type of retransmission request in 1116 can correspond to another type of receiver that implements another retransmission protocol on a second network layer. Accordingly, this method may facilitate more reliable communication than previously achievable because the transmitter may be interoperable with receivers carrying out different retransmission protocols.

Figure 12:
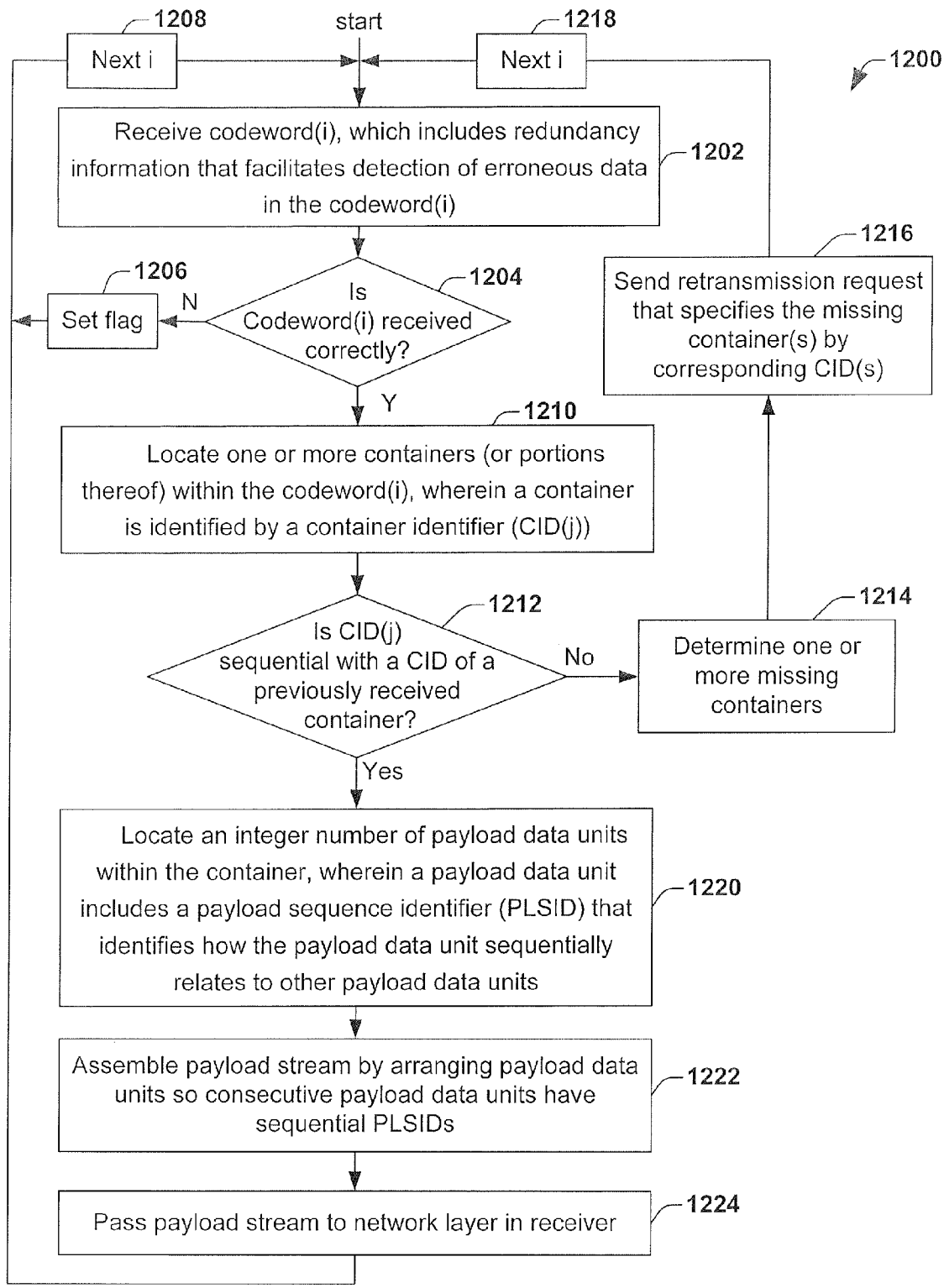
FIG. 12 illustrates a retransmission protocol as carried out by a receiver.

FIG. 12 depicts a method to be carried out by a receiver. The method 1200 starts at 1202, when a codeword(i) is received. Codeword(i) includes redundancy information that facilitates detection of erroneous data in codeword(i).

At 1204, the method 1200 determines whether data in the codeword is received correctly. The receiver uses the redundancy information in codeword(i) to determine whether the codeword(i) is received without errors (and/or whether any erroneous data in codeword(i) is correctable using the redundancy information). If codeword(i) includes uncorrectable data ("N" at 1204), the method 1200 can set a flag that indicates a codeword is received in error and can then proceed to 1208 where i is incremented and the next codeword is processed.

On the other hand, if the codeword is received correctly ("Y" at 1204), at 1210 the method locates one or more containers (or portions thereof) within codeword(i). Often, each container is identified by its own container identifier (CID(j)).

In 1212, the method analyzes whether the container identifier(s) in codeword(i) follow sequentially in a predetermined pattern relative to a container identifier in a previously received container. If not ("No" at 1212), at 1214 the method identifies one or more missing containers based on how CID(j) relates to the CID of the previously received containers. The method 1200 then proceeds to 1216 and sends a retransmission request to the transmitter which specifies the missing container(s) using corresponding CID(s). After the retransmission request is transmitted, the method 1200 increments i at 1218 and processes the next codeword.

If CID(j) does follow appropriately from a previously received container ("Yes" at 1212), the method 1200 proceeds to 1220 and locates an integer number of payload data units within the container identified by CID(j). The payload data units can include respective PLSIDs that identify how the payload data unit sequentially relates to other payload data units.

At 1222, the method assembles a payload stream by arranging the payload data units so consecutive payload data units have sequential PLSIDs.

As consecutive payload data units are assembled, they are passed to the first network layer in the receiver at 1224, thereby completing the communication process.

Although the invention has been illustrated and described with respect to one or more implementations, alterations and/or modifications may be made to the illustrated examples without departing from the spirit and scope of the appended claims. For example, although the invention has been described with respect to ADSL and VDSL communication systems that communicate over a pair of twisted copper wires, the invention is applicable to any communication system and any type of transmission medium. For example, other communication systems could include cell phones, pagers, mobile communication devices, industrial control systems, wide area networks, local area networks, among others. These and other systems could communicate over various types of communication medium, including but not limited to: wireless mediums, optical fiber, coaxial cable, powerline, and many others.

In addition, although various illustrated embodiments are illustrated as a hardware structure, the functionality and corresponding features of the present device can also be performed by appropriate software routines or a combination of hardware and software. In regards to software implementations, the term "computer readable medium" as used herein refers to any medium that participates in providing instructions to the device or to a controller (e.g., microprocessor) associated with the device. Such a medium may take numerous forms, including but not limited to, non-volatile media, volatile media, and transmission media. Non-volatile media includes, for example, optical or magnetic disks. Volatile media includes dynamic memory, such as SRAM or DRAM. Transmission media includes coaxial cables, copper wire, fiber optics, and busses internal or external to the device. Transmission media can also include electromagnetic waves, such as a voltage wave, light wave, or radio wave.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of transmitting data from a transmitter to a receiver, comprising:

providing a payload data stream comprising a plurality of payload data units, where a first payload data unit is eligible for re-transmission (EL) and a second payload data unit is non-eligible for re-transmission (NEL);

forming a container stream comprising a plurality of containers having respective container identifiers, where a container includes an integer number of payload data units including the first EL payload data unit and the second NEL payload unit and where the container identifiers collectively establish a predetermined order for consecutive containers;

forming a codeword stream comprising a plurality of codewords having respective redundancy information, where a codeword includes at least a portion of the container and where redundancy information of the codeword facilitates detection of erroneous data in the codeword; and transmitting the codeword from the transmitter to the receiver.

2. The method of claim 1, where the redundancy information in the codeword can be used to identify a particular payload data unit or a particular container having erroneous data within the codeword.

3. The method of claim 1, where the payload data units include respective payload sequence identifiers that collectively establish a predetermined order for consecutive payload data units.

4. The method of claim 1, where containers within the container stream are grouped so that respective containers have the same number of payload data units.

5. The method of claim 1, where the payload data units in the payload data stream have the same fixed bit length as one another.

6. The method of claim 5, where respective payload data units comprise a single Asynchronous Transfer Mode (ATM) cell or a single 65-octect codeword.

7. The method of claim 1, further comprising:
receiving a retransmission request from the receiver, the retransmission request including a container identifier bit field that specifies the container was not successfully received at the receiver;
retrieving the first EL payload data unit of the container and combining the first EL payload data unit with new data that differs from the second NEL payload data unit to form a retransmission container based on the retransmission request; and
transmitting the retransmission container from the transmitter to the receiver in response to the retransmission request.

8. A transceiver, comprising:
a first network interface layer adapted to receive a payload data stream comprising a plurality of payload data units, where the payload data units are classified as non-eliqible for re-transmission (NEL) and eligible for re-transmission (EL);
a second network interface layer adapted to group payload data units from the payload data stream into containers, thereby forming a container stream having a container with at least one EL payload data unit and at least one NEL payload unit;
a transmitter adapted to transmit the container from the container stream over a communication medium;
a receiver adapted to receive a retransmission request from over the communication medium; and
a retransmission controller adapted to, in response to receiving the retransmission request, form a retransmission container by assembling the at least one EL payload data unit of the container with new data, the new data differing from the at least one NEL payload data unit of the container.

9. The transceiver of claim 8, where the first network layer and second network layer reside in a physical layer of an OSI model.

10. The transceiver of claim 8, where the first network layer is a TPS/TC layer and where the second network layer is a PMS/TC layer.

11. The transceiver of claim 8, where the container controller is adapted to append container headers to respective containers, where a container header for a container comprises:
a retransmission bit field that identifies whether the container is being initially transmitted or retransmitted; and
a container identifier bit field, where container identifiers of the respective containers collectively establish a predetermined order for consecutive containers.

12. The transceiver of claim 8, further comprising:
a retransmission buffer adapted to store payload data units with respective container identifiers after the payload data units have been transmitted.

13. A method of receiving data at a receiver, comprising:
receiving a codeword that includes redundancy information;
using the redundancy information to determine whether the codeword includes correctable data or uncorrectable data;
if the codeword includes correctable data, then locating at least a portion of a container within the codeword, where the container is identified by a container identifier that identifies how the container sequentially relates to other containers in a container stream; and
locating an integer number of payload data units within the container, where payload data units are classified as non-eligible for re-transmission (NEL) and eligible for re-transmission (EL).

14. The method of claim 13, further comprising:
selectively generating a retransmission request based on whether the container identifier has a predetermined relationship with a previously received container identifier.

15. The method of claim 14, where the predetermined relationship is met if the container identifier follows consecutively from the previously received container identifier in accordance with a predetermined pattern.

16. The method of claim 14, further comprising:
selectively generating a retransmission request based on whether a payload data unit within the integer number of payload data units has a predetermined relationship with a previously received payload data unit.

17. The method of claim 16, further comprising:
assembling a payload stream by arranging the integer number of payload data units with other received payload data units so consecutive payload data units in the payload stream have sequential PLSIDs.

18. The method of claim 13, where payload data units comprise respective payload sequence identifiers (PLSIDs).

19. A receiver, comprising:
a data reception controller adapted to analyze whether a received codeword is correctly received, where the received codeword includes a first payload data unit that is non-eligible for re-transmission (NEL) and a second payload data unit that is eligible for re-transmission (EL);
a container controller adapted to generate a container stream from a plurality of correctly received codewords, where the container stream comprises a number of containers having respective container identifiers;
analysis circuitry adapted to analyze the container identifiers in the container stream to determine whether a container identifier is non-consecutive with a previously received container identifier.

20. The receiver of claim 19 further comprising:
a retransmission controller adapted to generate a retransmission request based on whether the container identifier is non-consecutive with the previously received container identifier.

21. The receiver of claim 19, where the redundancy information in the codeword can be used to identify a particular payload data unit or a particular container having erroneous data within the codeword for generation of retransmission requests.

22. The receiver of claim 19, where a container comprises an integer number of payload data units that are part of a payload stream.

23. The receiver of claim 22, where the payload data units are respectively associated with payload sequence identifiers that collectively establish a predetermined order for payload data units in the payload stream.

24. The receiver of claim 23, where the container controller is further adapted to re-order correctly received payload data units so that the received payload data units are passed to a network layer according to the predetermined order.

* * * * *

UNITED STATES PATENT AND TRADEMARK OFFICE
CERTIFICATE OF CORRECTION

PATENT NO. : 8,468,427 B2
APPLICATION NO. : 12/543916
DATED : June 18, 2013
INVENTOR(S) : Gert Schedelbeck et al.

It is certified that error appears in the above-identified patent and that said Letters Patent is hereby corrected as shown below:

In the Claims:

Column 15, line 3, for the claim reference numeral '6', "octect", should be changed to --octet--.

Column 15, line 20 & 21, for the claim reference numeral '8', "non-eliqible", should be changed to --non-eligible--.

Signed and Sealed this
Eighth Day of October, 2013

Teresa Stanek Rea
*Deputy Director of the United States Patent and Trademark Office*